(12) United States Patent
Yang

(10) Patent No.: US 10,627,952 B2
(45) Date of Patent: Apr. 21, 2020

(54) TOUCH DETECTION METHOD AND SYSTEM THEREOF

(71) Applicant: SHENZHEN GOODIX TECHNOLOGY CO., LTD., Shenzhen, Guangdong (CN)

(72) Inventor: Yang Yang, Guangdong (CN)

(73) Assignee: SHENZHEN GOODIX TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/110,579

(22) Filed: Aug. 23, 2018

(65) Prior Publication Data

US 2018/0364862 A1 Dec. 20, 2018

Related U.S. Application Data

(63) Continuation of application No. PCT/CN2017/076955, filed on Mar. 16, 2017.

(51) Int. Cl.
*G06F 3/041* (2006.01)
*G06F 3/044* (2006.01)
*H04B 1/69* (2011.01)

(52) U.S. Cl.
CPC ............ *G06F 3/0416* (2013.01); *G06F 3/044* (2013.01); *G06F 3/0418* (2013.01); *H04B 1/69* (2013.01); *H04B 2001/6904* (2013.01)

(58) Field of Classification Search
CPC ......... G06F 3/0416; G06F 3/044; H04B 1/69; H04B 2001/6904
See application file for complete search history.

(56) References Cited

U.S. PATENT DOCUMENTS

| 8,791,907 B2 | 7/2014 | Wu |
| 2007/0109274 A1 | 5/2007 | Reynolds |

(Continued)

FOREIGN PATENT DOCUMENTS

| CN | 102707855 A | 10/2012 |
| CN | 105786241 A | 7/2016 |

OTHER PUBLICATIONS

Extended European Search Report issued for European Application No. 17896321.1, dated Jan. 2, 2019.

(Continued)

*Primary Examiner* — Robert J Michaud
(74) *Attorney, Agent, or Firm* — Heslin Rothenberg Farley & Mesiti P.C.

(57) ABSTRACT

Some embodiments of the present invention provide a touch detection method and system. The touch detection method comprises: performing a spread spectrum process on a driving signal to generate a spectrum-spread signal; outputting the spectrum-spread signal to a driving terminal of a touch screen; receiving, from a response terminal of the touch screen, a coupled signal formed by coupling the spectrum-spread signal received by the driving terminal to the response terminal; and performing a de-spread spectrum process on the coupled signal to obtain a touch detection signal. Employing the embodiments of the present invention, an accuracy of a detection of a location on the touch screen can be improved by a spread spectrum technology, so as to enhance an anti-interference ability of a touch-controlled device.

11 Claims, 10 Drawing Sheets

(56) References Cited

U.S. PATENT DOCUMENTS

2011/0042152 A1* 2/2011 Wu .................. G06F 3/0416
178/18.03
2016/0202839 A1* 7/2016 Hwang .............. G06F 3/0416
345/174

OTHER PUBLICATIONS

Roberts, R., "All about Correlators", Oct. 16, 2008, URL:http://sss-mag.com/corr.html.
International Search Report and Written Opinion of the International Searching Authority for PCT/CN2017/076955 dated Dec. 20, 2017.

* cited by examiner

Spectrum-spread signal

TOUCH DETECTION METHOD AND SYSTEM THEREOF

CROSS-REFERENCE TO RELATED APPLICATIONS

The present disclosure is a continuation of international application No. PCT/CN2017/076955, filed on Mar. 16, 2017, which is hereby incorporated by reference in its entireties.

TECHNICAL FIELD

The present application relates to the field of detection technologies, and particularly, to a touch detection method and a system thereof.

BACKGROUND

Developing rapidly, the electronic devices have already been widely used in people's daily life. However, various electromagnetic interferences, such as electromagnetic noise from natural environment, artificial electromagnetic interference, and so on, exist in people's living environment. Therefore, consumers are paying increasing attention to the anti-interference ability of the electronic device.

The electromagnetic interferences with the existing electronic device, such as a mobile phone, and a PAD, etc., mainly come from a wireless communication system, a liquid crystal displays (LCD), and a charger built in the devices itself. The electronic device, however, utilizes weak electrical signals, and a slight electromagnetic interference will seriously affect an electrical signal process in the electronic device.

The inventor finds, in the process for realizing the present invention, there is at least a problem in the related art that one of the core technologies of a touch-controlled product is a location detection technology, and the electromagnetic interference will seriously affect an accuracy of a detection of the location, thus the detection performance of the touch-controlled product is affected.

SUMMARY

An objective of some embodiments of the present invention is to provide a touch detection method and system, which improves an accuracy of a detection of a location on a touch screen by a spread spectrum technology, so as to enhance the anti-interference ability of touch-controlled device.

An embodiment of the present application provides a touch detection method, including: performing a spread spectrum process on a driving signal to generate a spectrum-spread signal; outputting the spectrum-spread signal to a driving terminal of a touch screen; receiving, from a response terminal of the touch screen, a coupled signal formed by coupling the spectrum-spread signal received by the driving terminal to the response terminal; and performing a de-spread spectrum process on the coupled signal to obtain a touch detection signal.

Another embodiment of the present application provides a touch detection system, including: a touch screen body, a processor, and a code sequence generator, the processor being connected to the code sequence generator and the touch screen body, the code sequence generator being configured for generating a code sequence, and the processor being configured for performing a spread spectrum process on a driving signal by using the code sequence to generate a spectrum-spread signal, and outputting the spectrum-spread signal to a driving terminal of a touch screen; and the processor being further configured for receiving, from a response terminal of the touch screen, a coupled signal, and performing a de-spread spectrum process on the coupled signal by using the code sequence to obtain a touch detection signal; and wherein the coupled signal is formed by coupling the spectrum-spread signal received by the driving terminal to the response terminal.

An embodiment of the present application also provides a readable storage medium, including a computer program used in combination with a portable electronic device having a touch sensitive display, the computer program being executable by a processor to complete steps of: performing a spread spectrum process on a driving signal to generate a spectrum-spread signal; outputting the spectrum-spread signal to a driving terminal of a touch screen; receiving, from a response terminal of the touch screen, a coupled signal formed by coupling the spectrum-spread signal received by the driving terminal to the response terminal; and performing a de-spread spectrum process on the coupled signal to obtain a touch detection signal.

An embodiment of the present application also provides an electronic device, including one or more processors; a memory; and one or more programs, wherein the one or more programs are stored in the memory and configured to be executed by the one or more processors, the program(s) including instructions for performing steps of: performing a spread spectrum process on a driving signal to generate a spectrum-spread signal; outputting the spectrum-spread signal to a driving terminal of a touch screen; receiving, from a response terminal of the touch screen, a coupled signal formed by coupling the spectrum-spread signal received by the driving terminal to the response terminal; and performing a de-spread spectrum process on the coupled signal to obtain a touch detection signal.

Compared with the existing technologies, in the present embodiment, the spectrum-spread signal is output to the driving terminal of the touch screen, and the de-spread spectrum process is performed on the coupled signal received from the response terminal of the touch screen, so as to obtain the touch detection signal, such that the accuracy of the detection of the location on the touch screen may be improved, and the anti-interference ability of the touch-controlled device may be enhanced.

In addition, a mode of the de-spread spectrum process is a mode of a sliding-correlation de-spread spectrum of which a step size is less than or equal to a minimum value among a plurality of preset capacitor time constants corresponding to a plurality of capacitor nodes in the touch screen. In this embodiment, the mode of the sliding-correlation de-spread spectrum is used, and a value of the step size of the sliding-correlation de-spread spectrum is constrained in consideration of a signal delay factor during the location detecting process, so as to realize the de-spread spectrum process.

In addition, the step size of the sliding-correlation de-spread spectrum and a sampling frequency of a chip of the code sequence in the de-spread spectrum process are the reciprocal with respect to each other, and a mode of a setting of the sampling frequency of the chip includes: calculating a number of the sampled points according to the preset threshold of an autocorrelation function of the code sequence; calculating the sampling frequency of the chip in accordance with the number of the sampled points, and a length and a time width of the code sequence. In the present embodiment, it is provided a specific setting method of the sampling frequency of the chip, and the sampling frequency of the chip set thereby can satisfy the requirement of the value of the step size of the sliding-correlation de-spread spectrum.

In addition, calculating the number of the sampled points of the chip in accordance with the preset threshold of the autocorrelation function of the code sequence particularly includes: calculating a time delay difference threshold corresponding to the preset threshold in accordance with an expression of the autocorrelation function and the preset threshold; and calculating the number of the sampled points of the chip in accordance with the time delay difference threshold. In this embodiment, a specific method for calculating the number of the sampled points of the chip is provided.

In addition, the driving and the response terminals include respectively m driving electrodes and n response electrodes intersecting with each other to form m*n capacitor nodes, each response electrode intersecting with the m driving electrodes to form m capacitor nodes, and the spectrum-spread signal being output to the m driving electrodes simultaneously. Synchronizing the code sequence in the spread spectrum process by using the sliding-correlation method particularly includes: performing correlation operation, with m code sequences corresponding to the m capacitor codes respectively, on the coupled signal output from each response electrode; and generating a current correlation value corresponding to each capacitor node; calculating, for each capacitor node, (m−1) interference values corresponding to said capacitor node in accordance with the preset capacitor time constants of the (m−1) capacitor nodes excluding said capacitor node, wherein the (m−1) interference values are respectively generated by the (m−1) capacitor nodes; subtracting the (m−1) interference values corresponding to said capacitor node from the current correlation value corresponding to said capacitor node to obtain a capacitor detection values of said capacitor node, wherein the touch detection signals include the capacitor detection values of the m*n capacitor nodes. The present embodiment provides a method for removing interference terms to obtain the touch detection signal in the case where multiple driving signals are input to the driving electrodes.

In addition, setting the preset capacitor time constants of the (m−1) capacitor nodes excluding said capacitor node includes: outputting the spectrum-spread signal to the (m−1) driving electrodes sequentially; performing a correlation operation on the (m−1) coupled signals output from the response electrode sequentially; obtaining the number of shift points corresponding to the maximum correlation value in each correlation operation; and calculating a preset capacitor time constant of each capacitor node in accordance with the number of shift points, a preset number of the sampled points of and a preset time unit of the chip. In the present embodiment, it is described in detail a setting mode of the preset capacitor time constants of the (m−1) capacitor nodes excluding said capacitor node.

In addition, the spread and de-spread spectrum processes use the same code sequence pre-stored in a built-in storage module or generated in real time by a built-in code sequence generating module. This embodiment provides two modes of acquiring the code sequence.

In addition, the mode of the spread spectrum process is a mode of a direct sequence spread spectrum coding. The present embodiment provides a specific mode of the spread spectrum process.

BRIEF DESCRIPTION OF THE DRAWINGS

One or more embodiments are described as exemplary illustrations with reference to the corresponding figures in the accompanying drawings, and the exemplary illustrations do not constitute a limitation to the embodiments. Elements with the same reference numerals in the accompanying drawings represent similar elements. The figures in the accompanying drawings do not constitute a limitation on scale, unless otherwise stated particularly.

DETAILED DESCRIPTION

In order to make the objective, the technical solution and the advantages of the invention clearer, some embodiments of the present invention will be explained below in detail with reference to the accompanying drawings and embodiments. It should be understood that the specific embodiments described herein only explain the invention but do not limit thereon.

Figure 1:
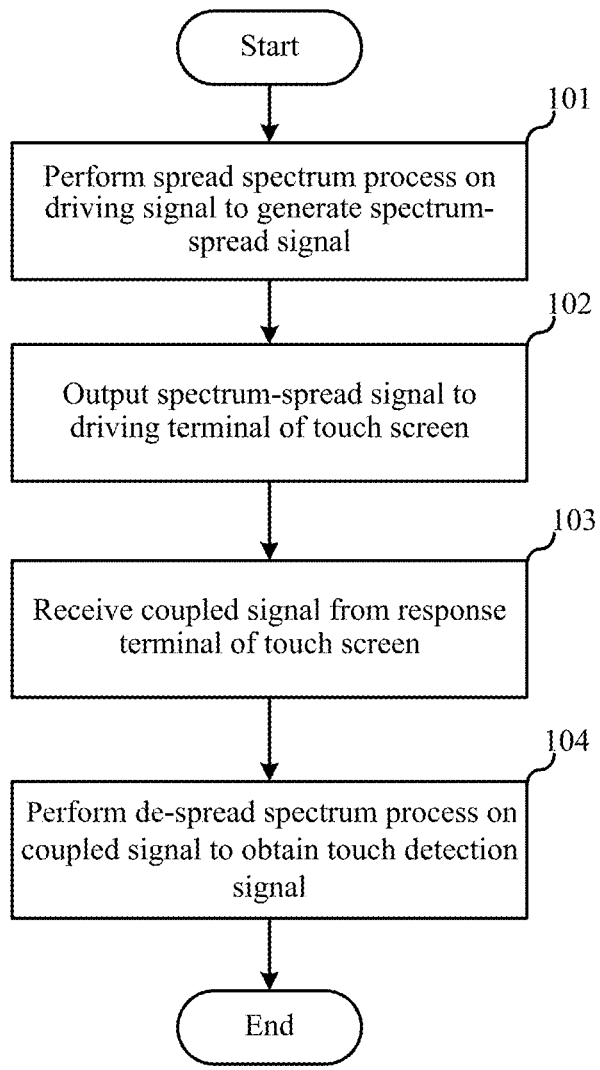
FIG. 1 is a specific flowchart of a touch detection method according to a first embodiment of the present application.

A first embodiment of the present application relates to a touch detection method, which is applied to a touch-controlled electronic device, including a mobile phone, and a laptop computer, etc. A specific flowchart of the touch detection method is shown in FIG. 1.

At step 101, a spread spectrum process is performed on a driving signal to generate a spectrum-spread signal.

In particular, the driving signal is, for example, represented by v(t), and a code sequence uncorrelated with the driving signal is, for example, represented by c(t). The code sequence is used to spread a spectrum of the driving signal to generate the spectrum-spread signal that is represented, for example, by d(t). The spectrum-spread signal d(t) is expressed by a formula of d(t)=v(t)c(t), and a bandwidth occupied thereby is much more than a minimum bandwidth required for transmitting the driving signal.

In the present embodiment, the mode of the spread spectrum process can be, but not limited to, a mode of a direct sequence spread spectrum coding. A code sequence uncorrelated with the driving signal can be a PN code (Pseudo-Noise Code, pseudo random code sequence), for example, an m sequence, a Gold sequence, and/or a Walsh sequence, etc. However, this embodiment is not limited thereto.

At step 102, the spectrum-spread signal is output to a driving terminal of a touch screen.

In particular, the driving signal of which the spectrum is spread (i.e., spectrum-spread signal d(t)) is output to the driving terminal of the touch screen.

At step 103, a coupled signal is received from a response terminal of the touch screen.

Figure 2:
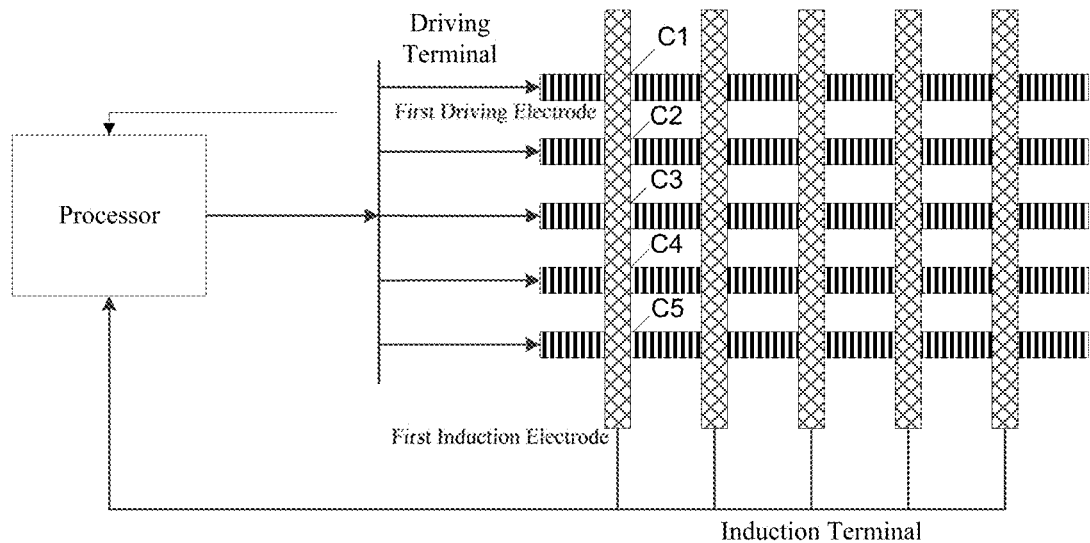
FIG. 2 is a block diagram of a scheme of a direct sequence spread spectrum coding according to the first embodiment of the present application.

In particular, the coupled signal is formed by coupling the spectrum-spread signal received by a driving terminal to the response terminal, and is received from the response terminal of the touch screen.

Where the driving and the response terminals of the touch screen includes respectively a plurality of driving and response electrodes of which both intersect with each other to form capacitor nodes. As shown in FIG. 2, the driving terminal of the touch screen includes 5 driving electrodes, the response terminal includes 5 response electrodes, and the driving electrodes intersect with the response electrodes to form 25 capacitor nodes, where first driving electrodes intersect a first response electrode to form five capacitor nodes C1, C2, C3, C4, C5. Due to existence of the capacitor nodes in the touch screen, there will be, however, a certain time delay when the spectrum-spread signal is coupled to the response terminal from the driving terminal. For example, the spectrum-spread signal is d(t)=v(t)c(t), then a coupled signal coupled through the driving terminal to the response terminal is Cv(ωt−ωτ)c(t−τ), where C is a capacitance of the coupling node, τ is a time constant of a capacitor node, and τ=RC.

At step 104, a de-spread spectrum process is performed on the coupled signal to obtain a touch detection signal.

In particular, the mode of the de-spread spectrum process can be a mode of the sliding-correlation de-spread spectrum, i.e., the sliding-correlation de-spread spectrum is performed on the coupled signal received by the response terminal of the touch screen to obtain the touch detection signal.

In the present embodiment, a step size of sliding-correlation de-spread spectrum and a sampling frequency of the chip of a code sequence in a de-spread spectrum process are the reciprocal with respect to each other. Since existing spread spectrum technology is each applied to wireless signal transmissions, while this application applies the spread spectrum technology to a detection of a location on the touch screen, and a time delay during a location detecting is related to the time constant of the capacitor node. Therefore, in the present embodiment, it is only when the step size of the sliding-correlation de-spread spectrum is less than or equal to a minimum value among a plurality of preset capacitor time constants corresponding to the plurality of capacitor nodes in the touch screen that a synchronous de-spread spectrum can be achieved.

It is to be explained that the mode of de-spread spectrum process in this embodiment is a mode of sliding-correlation de-spread spectrum, but not limited thereto in practice. The present embodiment does not limit thereon.

In the present embodiment, the accuracy of the detection of the location on the touch screen can be improved by applying the existing spread spectrum technology thereto, and the anti-interference ability of the touch-controlled device is enhanced.

Next, the existing spread spectrum technology is introduced specifically.

Figure 3:
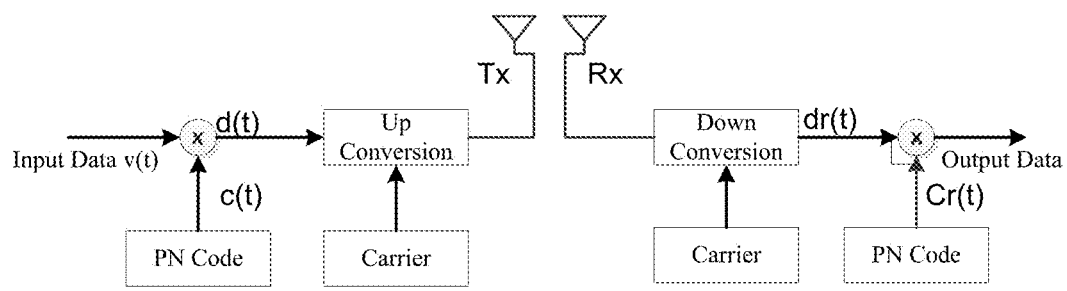
FIG. 3 is a block diagram of a direct sequence spread spectrum system according to the first embodiment of the present application.

Firstly, the mode of the direct sequence spread spectrum coding in the related art will be introduced. The block diagram of the direct sequence spread spectrum system is as shown in FIG. 3, and a principle thereof is as follows:

1. Inputting a signal

A binary driving signal satisfies an equation of $$v(t) = \sum_{n=-\infty}^{\infty} a_n g_T(t - nT_b)$$

$\{a_n = \pm 1, -\infty < n < \infty\}$, with $g_T(t)$ being a rectangular pulse of which the duration is $T_b$. A PN code satisfies an equation of $$c(t) = \sum_{n=-\infty}^{\infty} c_n p(t - nT_c),$$

$\{c_n = \pm 1, -\infty < n < \infty\}$, p(t) being a rectangular pulse of which the duration is $T_c$.

where the rate of v(t) is R and $T_b = 1/R$, the rate of c(t) is $R_c$ and $T_c = 1/R_c$. It is thus derived that a bandwidth $BW_{data}$ of the driving signal is approximately R, and a bandwidth $BW_{ss}$ of the PN code is approximately $R_c$.

Figure 4A:
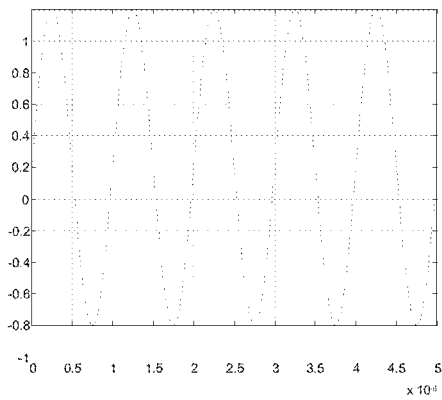
FIG. 4a is a diagram of a time-domain of a binary driving signal according to the first embodiment of the present application.
Figure 4B:
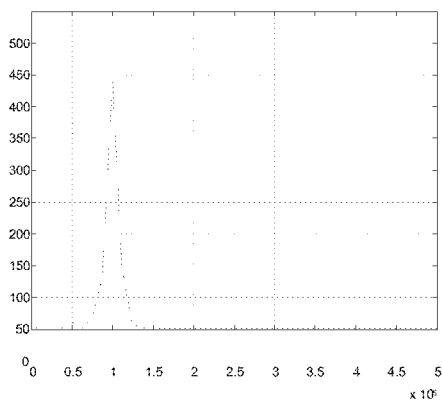
FIG. 4b is a diagram of a frequency-domain of the binary driving signal according to the first embodiment of the present application.
Figure 4C:
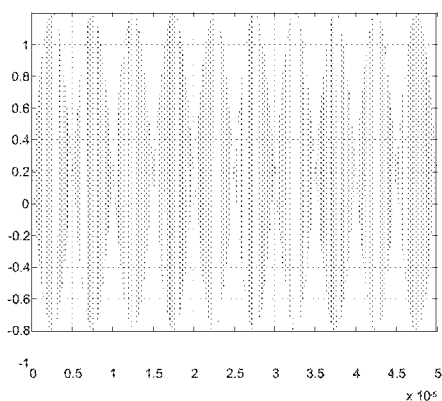
FIG. 4c is a diagram of a time-domain of a spectrum-spread signal according to the first embodiment of the present application.
Figure 4D:
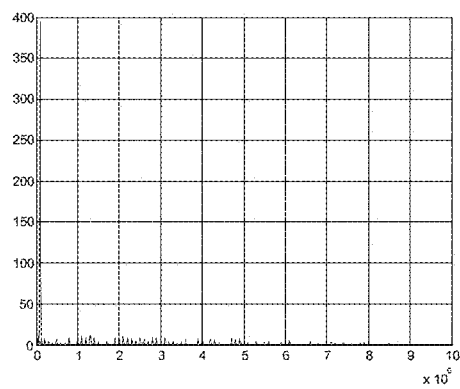
FIG. 4d is a diagram of a frequency-domain of the spectrum-spread signal according to the first embodiment of the present application.

2. Performing the spread spectrum process on an input signal. The binary driving signal v(t) and the PN code c(t) are multiplied directly by each other to obtain a new transmitted spectrum-spread signal d(t)=v(t)c(t). In doing so, the rate of the spectrum-spread signal is that of the PN code $R_c$, and the bandwidth is also approximately $R_c$, which realizes an expansion of the spectrum, and a spread spectrum gain is $Gp = BW_{ss}/BW_{data} = R_c/R = N_c$. The time and frequency domains of the binary driving signal are as shown in FIGS. 4a and 4b. The diagrams of the time and frequency domains of the spectrum-spread signal d(t) are as shown in FIGS. 4c and 4d.

Figure 5:
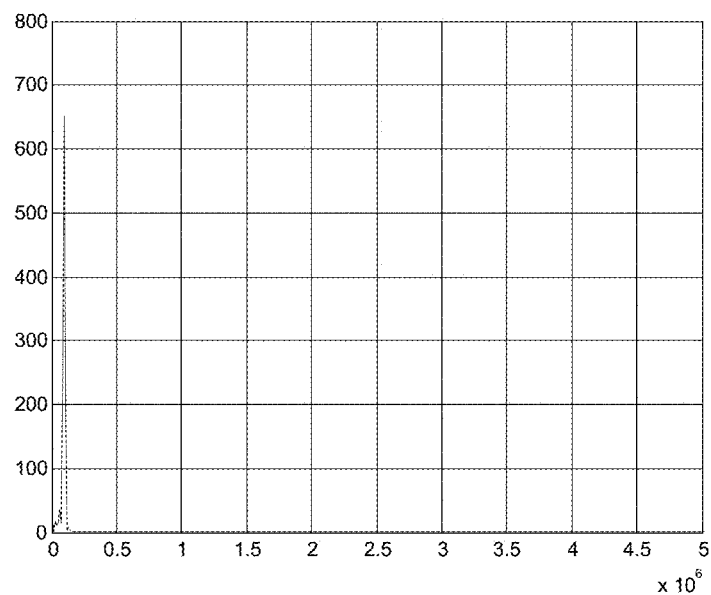
FIG. 5 is a diagram of a frequency-domain of a touch detection signal according to the first embodiment of the present application.

3. Performing de-spread spectrum process on the received spectrum-spread signals. That is, the spectrum-spread signal is multiplied by one PN code that is identical to and synchronous with a transmission terminal, i.e., $d(t)c(t)=v(t)c(t)^2=v(t)$ $(c(t)^2=1)$, which realizes the de-spread spectrum and obtains the touch detection signal. The diagram of the frequency-domain of the touch detection signal obtained after the de-spread spectrum is as shown in FIG. 5.

The touch detections signal obtained from the aforementioned process has preferable anti-interference performance.

With an assumption that an interference signal is n(t), then the coupled signal is $r(t)=d(t)+n(t)=v(t)c(t)+n(t)$, and the coupled signal is multiplied by the PN code to obtain:

$$r(t)c(t)=d(t)c(t)+n(t)c(t)=v(t)c(t)^2+n(t)c(t)=v(t)+n(t)c(t).$$

At this time, the driving signal v(t) is recovered. Meanwhile, there is a product term of the interference signal multiplied by the PN code, due to which the bandwidth of the interference is expanded but its power spectral density is reduced, because the interference is uncorrelated with the PN code.

The recovered data v(t) subjected to the de-spread spectrum is a narrowband signal (R), whereas the interference signal is converted into a broadband signal ($R_c$). The spectrum-despread signal passes through a filter for filtering the narrowband signal, and a majority of the interference signal is filtered out. Therefore, the effect due to the interference signal is reduced to 1/Gp of the original effect.

There are generally two types of interference signals: a narrowband interference and a wideband interference.

Figure 6:
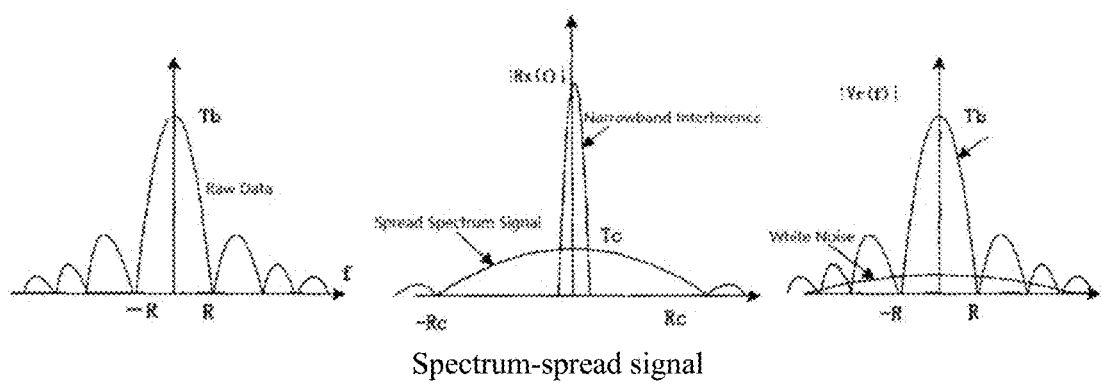
FIG. 6 is a spectrum diagram of a driving signal and a narrowband interference according to the first embodiment of the present application.

If the interference signal is the narrowband interference: only 1/Gp of the original energy of the narrowband interference is remained within a data bandwidth R after the de-spread spectrum, so that the system's anti-narrowband interference performance is increased by Gp times. An essential reason for the improvement on the anti-interference performance is that the driving signal v(t) is multiplied by the PN code c(t) twice in the entire spread spectrum system, whereas the interference signal is multiplied thereby only once. The spectrum diagram of the driving signal and the narrowband interference is as shown in FIG. 6.

The interference signal is the broadband interference: the original data is de-spread by being multiplied by a de-spread spectrum code, and the multiplication realizes a function of the spread spectrum due to uncorrelation of the interference signal with the PN codes. There are two main sources of the broadband interference signal: the interferences from other users in the case of multiple spread spectrum users, and the Gaussian noise. At this time, the signal to noise ratio of the system has not been increased, but the energy of Gaussian noise is increased by Gp times due to the greater channel bandwidth.

$$N_{data}=N_0BW_{data} \rightarrow N_{ss}=N_0BW_{ss}=N_{data}Gp$$

Therefore, the spectrum-spread signal has a lower energy density than that of the directly transmitted signal.

It is necessary to be explained that in this embodiment, the spread and the de-spread spectrum processes use the same code sequence which is pre-stored in the built-in storage module or generated in real time by the built-in code sequence generating module.

A length of the PN codes will also affects the anti-interference ability of the mode of the direct sequence spread spectrum coding. The driving and the response terminals of the touch screen are provided respectively with 5 driving electrodes and 6 response electrodes. With an assumption that capacitances of all capacitor nodes are 1s, 1. when a signal to noise ratio (SNR)=0, and a PN code length is 127, capacitances (Cs) of respective capacitor nodes are listed in the following table:

| 1.1620 | 1.0059 | 0.7084 | 0.6743 | 0.6935 | 1.2224 |
|--------|--------|--------|--------|--------|--------|
| 1.1925 | 1.2432 | 0.8173 | 1.3087 | 1.2032 | 0.8499 |
| 0.9736 | 1.3196 | 0.7081 | 1.3024 | 1.2982 | 1.1957 |
| 1.383  | 0.8185 | 0.8310 | 1.2756 | 1.2520 | 1.2927 |
| 0.7581 | 0.6846 | 0.9050 | 1.1653 | 0.9761 | 0.9088 |

2. when a signal to noise ratio (SNR)=0, and a PN code length is 1023, capacitances (Cs) of respective capacitor nodes are listed in the following table:

| 1.0265 | 1.0272 | 1.0281 | 1.0307 | 1.0265 | 1.0280 |
|--------|--------|--------|--------|--------|--------|
| 1.0266 | 1.0274 | 1.0282 | 1.0307 | 1.0267 | 1.0280 |
| 1.0267 | 1.0275 | 1.0283 | 1.0307 | 1.0268 | 1.0280 |
| 1.0267 | 1.0277 | 1.0284 | 1.0307 | 1.0269 | 1.0281 |
| 1.0268 | 1.0278 | 1.0286 | 1.0307 | 1.0270 | 1.0281 |

3. when a signal to noise ratio (SNR)=0, and a PN code length is 1023, capacitances (Cs) of respective capacitor nodes are listed in the following table:

| 1.0121 | 1.0139 | 1.0145 | 1.0117 | 1.0142 | 1.0135 |
|--------|--------|--------|--------|--------|--------|
| 1.0120 | 1.0139 | 1.0145 | 1.0117 | 1.0142 | 1.0135 |
| 1.0120 | 1.0139 | 1.0145 | 1.0117 | 1.0142 | 1.0135 |
| 1.0120 | 1.0139 | 1.0145 | 1.0117 | 1.0142 | 1.0135 |
| 1.0120 | 1.0139 | 1.0145 | 1.0117 | 1.0142 | 1.0135 |

As can be seen from above, the longer the length of the PN code is, the more powerful the anti-interference ability of the mode of the direct sequence spread spectrum coding is.

Compared with the existing technologies, in the embodiments of the present application, the spectrum-spread signal is output to the driving terminal of the touch screen, and the de-spread spectrum process is performed on the coupled signal received from the response terminal of the touch screen to obtain the touch detection signal, thus the accuracy of the detection of the location on the touch screen can be improved, and the anti-interference ability of the touch-controlled device can be enhanced.

The second embodiment of the present application relates to a touch detection method, and is an elaboration of the first embodiment which substantially lies in that the step size of the sliding-correlation de-spread spectrum and the sampling frequency of the chip of the code sequence in the de-spread spectrum process are the reciprocal with respect to each other in the first embodiment, and a mode of a setting of the sampling frequency of the chip is described specifically in the present embodiment.

Figure 7:
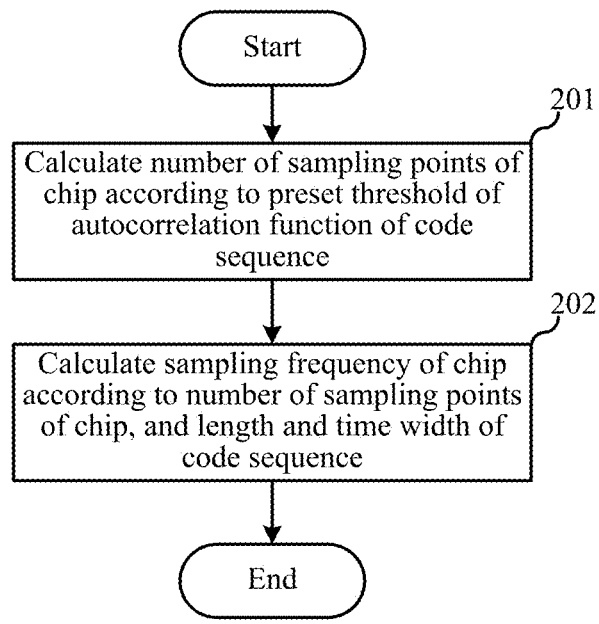
FIG. 7 is a specific flow chart of a setting mode of a sampling frequency of the chip according to a second embodiment of the present application.

In the present embodiment, the specific flow of the setting of the sampling frequency of the chip is as shown in FIG. 7.

At step 201, a number of sampled points of the chip is calculated in accordance with a preset threshold of an autocorrelation function of a code sequence.

Figure 8:
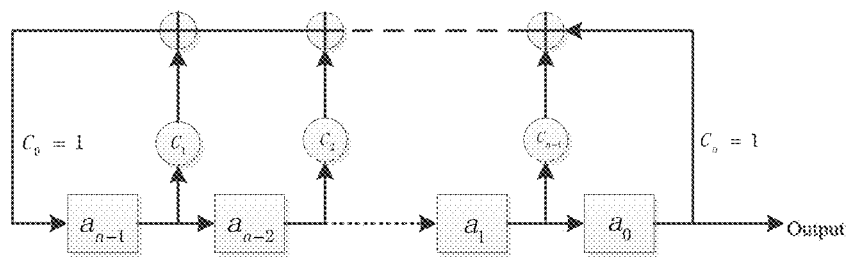
FIG. 8 is a block diagram of a linear feedback shift register according to the second embodiment of the present application.

Specifically, in this embodiment, the PN code is selected as an m sequence, and is generated by a linear feedback shift register. FIG. 8 is a linear feedback shift register. According to different ary-numbers n, a linear feedback shift register can be used to generate PN codes with different lengths. The length of the PN code (i.e., the code sequence period) is $L=2^n-1$. For example, the ary-number $n=7$, then $L=2^7-1=127$ and the code sequence period is 127, that is, the PN codes have 127 chips. The feedback coefficients of linear feedback shift registers corresponding to PN codes with different ary-numbers are shown in the following table.

| n | Primitive Polynomial Algebraic Expression | Octal representation |
|---|---|---|
| 2 | $x^2 + x + 1$ | 7 |
| 3 | $x^3 + x + 1$ | 13 |
| 4 | $x^4 + x + 1$ | 23 |
| 5 | $x^5 + x^2 + 1$ | 45 |
| 6 | $x^6 + x + 1$ | 103 |
| 7 | $x^7 + x^3 + 1$ | 211 |
| 8 | $x^8 + x^4 + x^3 + x^2 + 1$ | 435 |
| 9 | $x^9 + x^4 + 1$ | 1021 |
| 10 | $x^{10} + x^3 + 1$ | 2011 |
| 11 | $x^{11} + x^2 + 1$ | 4005 |
| 12 | $x^{12} + x^6 + x^4 + x + 1$ | 10123 |
| 13 | $x^{13} + x^4 + x^3 + x + 1$ | 20033 |
| 14 | $x^{14} + x^{10} + x^6 + x + 1$ | 42103 |
| 15 | $x^{15} + x + 1$ | 100003 |
| 16 | $x^{16} + x^{12} + x^3 + x + 1$ | 210013 |
| 17 | $x^{17} + x^3 + 1$ | 400011 |
| 18 | $x^{18} + x^7 + 1$ | 1000201 |
| 19 | $x^{19} + x^5 + x^2 + x + 1$ | 2000047 |
| 20 | $x^{20} + x^3 + 1$ | 4000011 |
| 21 | $x^{21} + x^2 + 1$ | 10000005 |
| 22 | $x^{22} + x + 1$ | 20000003 |
| 23 | $x^{23} + x^5 + 1$ | 40000041 |
| 24 | $x^{24} + x^7 + x^2 + x + 1$ | 100000207 |
| 25 | $x^{25} + x^3 + 1$ | 200000011 |

A common autocorrelation function of the PN code sequence has a property similar to that of autocorrelation function of a white noise, then the autocorrelation function of the PN code sequence is:

$$R(j) = \begin{cases} \frac{1}{L}\sum_{i=1}^{L} x_i^2 = 1 & j = 0 \\ \frac{1}{L}\sum_{i=1}^{L} x_i x_{i+j} = -\frac{1}{L} & j \neq 0 \end{cases}$$

Figure 9A:
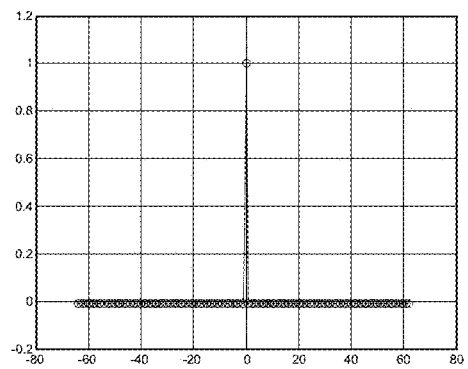
FIG. 9a is a diagram of an autocorrelation function of a PN code sequence according to the second embodiment of the present application.
Figure 9B:
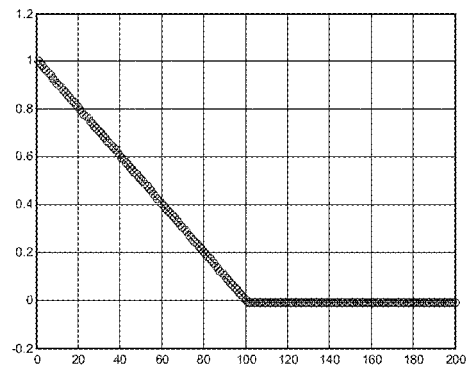
FIG. 9b is a diagram of relationship between a value of the autocorrelation function and an unaligned deviation of the same PN code according to the second embodiment of the present application.

The autocorrelation function of the PN code sequence (the ary-number is $n=7$, as an example) is as shown in FIG. 9a. The relationship between the value of the autocorrelation function of the same PN code sequence and the number of the offset sampled points is shown in FIG. 9b.

Figure 10:
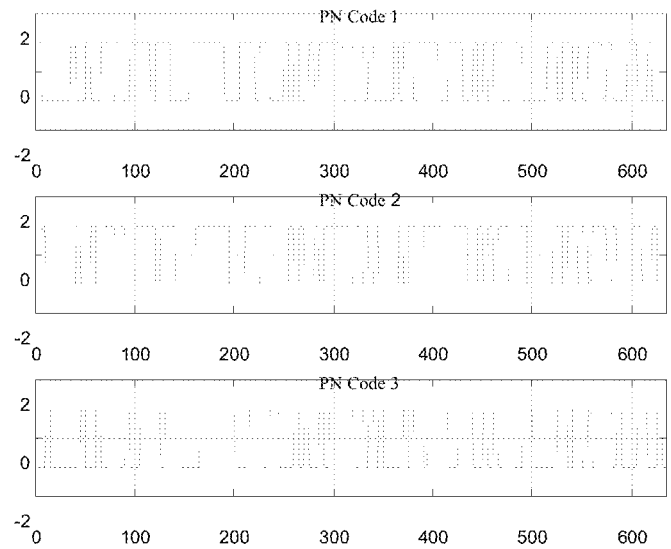
FIG. 10 is a sequence diagram of a 7-ary PN code according to the second embodiment of the present application.

For example, with the m sequences generated by a linear feedback shift register with an ary-number of $n=7$, and 5 points sampled per chip, then the number of the sampled points of m sequences is 635, as shown in FIG. 10.

Referring to FIG. 2, which shows the block diagram of the scheme of a direct sequence spread spectrum coding.

1. A driving signal is coded by $\cos(\omega t)$, and the coded driving signal is modulated by a spread spectrum, i.e., the coded driving signal is multiplied by the PN code to obtain a spectrum-spread signal, that is, $\cos(\omega t) \cdot P_n(t)$;

2. the spectrum-spread signal $\cos(\omega t) \cdot P_n(t)$ is output to the driving terminal of the touch screen, and the spectrum-spread signal $\cos(\omega t) \cdot P_n(t)$ received by the driving terminal is coupled to the response terminal to form a coupled signal: $C \cos(\omega t - \omega \tau) \cdot P_n(t-\tau)$, where an intersection between the driving and the response terminals of the touch screen is a coupling node, C is a capacitance size of the coupling node, $\tau$ is a time constant of the capacitor node, and $\tau=RC$, which may also be considered to be a time delay difference between a local PN code and a PN code in the received signal;

3. The PN code reference signal during the de-spread spectrum is $I_{ref}=\cos(\omega t) \cdot P_n(t)$, and $Q_{ref}=\sin(\omega t) \cdot P_n(t)$; and a spectrum-despread output signal of branch I is $I=C \cdot P_n(t-\tau) P_n(t) \cos(\omega t+\theta) \cos(\omega t)=0.5C \cdot P_n(t-\tau) P_n(t) \cdot (\cos(2\omega t+\theta)+\cos\theta)$, it is integrated over a time period T, then $$I(k) = C \cdot \frac{P(k)T}{2}(1-\varepsilon)\cos\theta,$$

with $P(k)$ being a correlated value of an aligned portion in a unit chip, T being a total time width of one PN code, and $\varepsilon=\tau/T_C$ being a time length of one chip.

Similarly, an expression of integration of branch Q over the time period T may be derived as:

$$Q(k) = C \cdot \frac{P(k)T}{2}(1-\varepsilon)\sin\theta$$

4. The acquired touch detection signal is obtained:

$$Z(k) = \sqrt{I^2(k)+Q^2(k)} = C \cdot \frac{P(k)T}{2}(1-\varepsilon)$$

It is known from the expression that when the PN codes are completely synchronous, $\varepsilon=0$, $P(k)=1$. At this time, the value of the capacitor node C may be derived, and thus a change in C can be sensed to determine whether there is a touch.

It is known from the above that in order to ensure that there is no change in the capacitor node C when there is no touch, it is required that the PN codes have to be completely synchronous, but a complete synchronization can not be realized. In the present embodiment, when an amount of the change in the capacitor node C is less than a certain value, it is considered that there is no touch. Accordingly, a synchronization precision can be set, and the amount of the change in C is less than a certain value when the synchronization precision reaches a certain indicator.

Therefore, one preset threshold of the autocorrelation function of the code sequence can be set as the synchronization precision to determine whether there is a touch.

Figure 11:
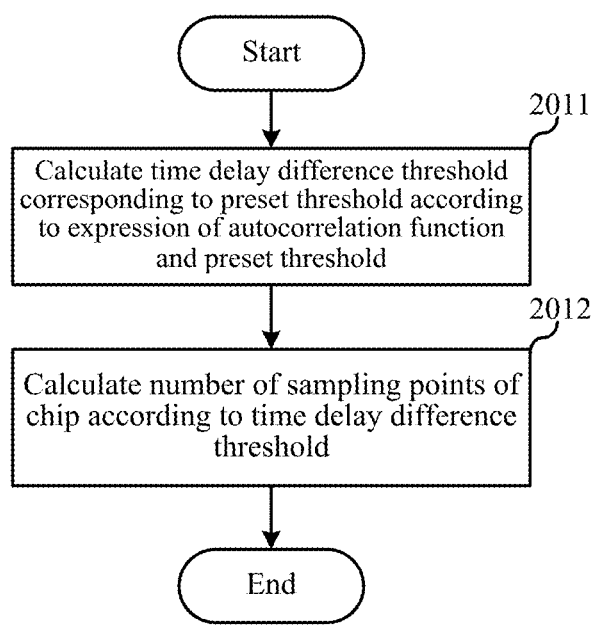
FIG. 11 is a specific flow chart of calculating the number of the sampled points of the chip according to the second embodiment of the present application.

In the present embodiment, a specific flow chart of calculating the number of the sampled points of the chip in accordance with the preset threshold of the autocorrelation function of the code sequence is shown in FIG. 11.

At sub-step 2011, the time delay difference threshold corresponding to the preset threshold is calculated according to the expression of the autocorrelation function and the preset threshold.

At sub-step 2012, the number of the sampled points of the chip is calculated in accordance with the time delay difference threshold.

In particular, taking as an example where the ary-number of the PN code is $n=7$ and the length of the PN code is $L=127$, the time delay of the capacitor node results in a certain time delay difference between the PN code and the PN code in the touch detection signal (i.e., both are not aligned with each other).

The threshold of the autocorrelation function is (−1/127) when the time delay difference threshold is greater than or equal to a time length of a single chip.

When the time delay difference threshold is less than the time length of a single chip, the threshold of the autocorrelation function is linear (monotonically decreasing) with the time length t of one chip. When t=0, the threshold of the autocorrelation function is 1, and when t=1 time unit of the chip, the threshold of the autocorrelation function is (−1/127).

At this time, the autocorrelation function may be expressed by a piecewise function of:

$$f(t) = \begin{cases} \dfrac{\left(-1-\dfrac{1}{L}\right)}{T_1} gt+1, & 0 \leq t < T_1 \\ -\dfrac{1}{L}, & T_1 \leq t < T \end{cases},$$

where T1 is a time length of one chip, T is a time length of the PN code, and L is a number of the chips of the PN code.

The threshold of the autocorrelation function f(t) may be preset. If it is preset that f(t)>0.99, it can be derived according to a first piece of the piecewise function that t<(0.01×T$_1$)/(1+1/L), and (1+1/L)≈1, as 1/L<<1. Thus, t<(0.01×T1)/(1+1/L)≈(0.01×T1)=T1/100.

That is, t<T1/100. A denominator shall be an integer, i.e., the integer may be greater than or equal to 100. In other words, the number of sampled points is greater than or equal to 100.

It is known from the above that when the number of sampled points on a chip is >=100, that is, a controllable time precision of the local PN code which is an offset thereof is ≤T/100, the threshold of the autocorrelation is >=0.99.

At this time, in the touch detection signal, $$\frac{P(k)T}{2}(1-\varepsilon) \geq 0.99.$$

Thus, it can be considered that the value of the capacitor node C is unchanged when there is no touch, and an error resulting from an imperfect synchronization may be ignored.

At step 202, the sampling frequency of the chip is calculated according to the number of the sampled points of the chip, and the length and time width of the code sequence.

In particular, with an assumption that the time width of the PN code sequence is T, the code sequence period is L, the sampling frequency of the chip is f, and the number of the sampled points is N, then it is satisfied that f·T=N·L. In a case where the time width T, the period of the code sequence L, and the number of the sampled points N are known, the sampling frequency of the chip may be derived.

Compared with the first embodiment, in this embodiment, it is provided a specific setting method of the sampling frequency of the chip, and the sampling frequency of the chip set thereby can satisfy the requirement of the value of the step size of the sliding-correlation de-spread spectrum. In other words, in a terminal, a sliding de-spread spectrum is performed according to the sampling frequency of the chip, which may result in a synchronization precision satisfying the requirement.

The third embodiment of the present application relates to a touch detection method, and the third embodiment is an elaboration of the first embodiment. The substantial elaboration lies in how to remove the interference in the de-spread spectrum of the coupled signal in a case of fully driven input.

In the present embodiment, the driving and the response terminals respectively include m driving electrodes and n response electrodes of which both intersect with each other to form m*n capacitor nodes, each response electrode intersecting with the m driving electrodes to form m capacitor nodes, and the spectrum-spread signal being output to the m driving electrodes simultaneously.

Figure 12:
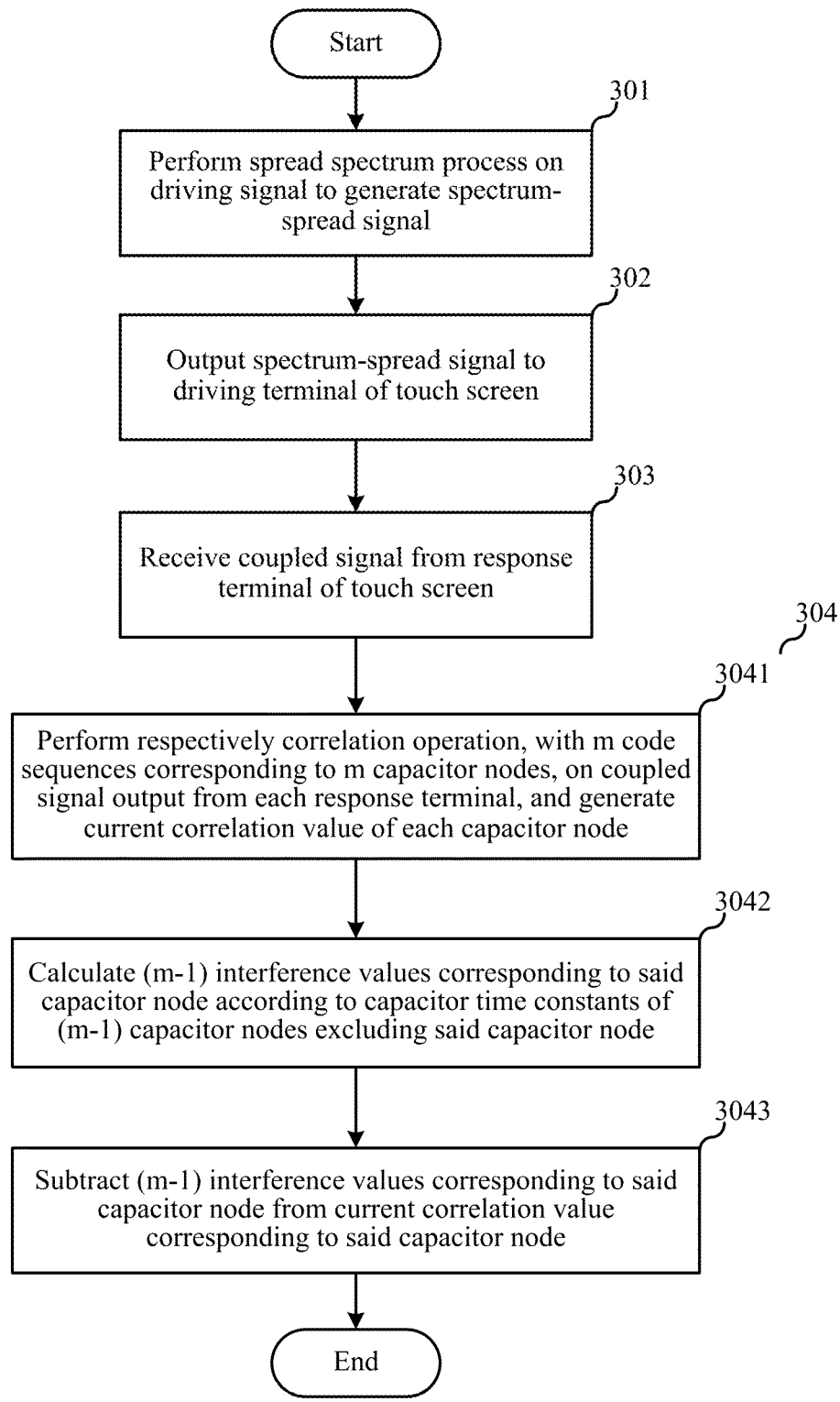
FIG. 12 is a specific flow chart of a touch detection method according to a third embodiment of the present application.

The specific flow chart of the touch detection method provided in the present embodiment is shown in FIG. 12.

Where steps 301 to 303 are roughly identical to steps 101 to 103, and will not be repeated again herein. A difference lies in that a step 304 in the present embodiment particularly includes the following sub-steps.

At sub-step 3041, a correlation operation, with m code sequences corresponding to m capacitor codes, is performed respectively on the coupled signal output from each response electrode, and a current correlation value corresponding to each capacitor node is generated.

Figure 13:
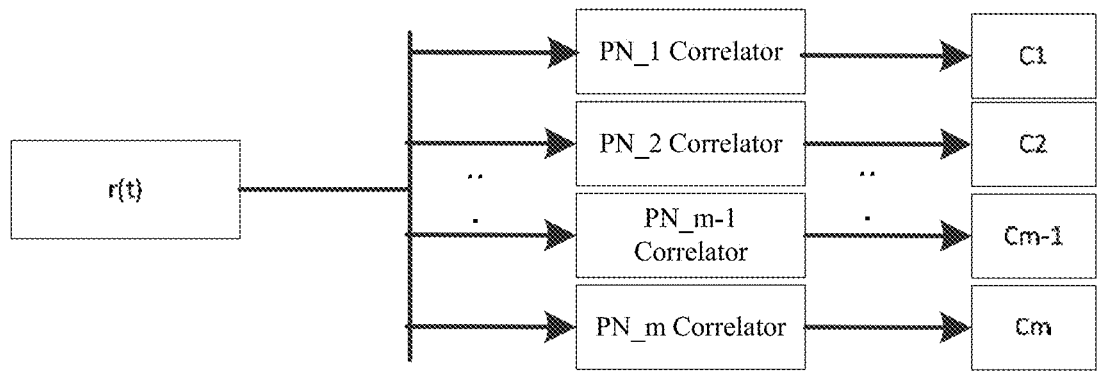
FIG. 13 is a block diagram of transmitting a coupled signal to m correlators according to the third embodiment of the present application.

In particular, with reference to FIG. 13, the spectrum-spread signal is output simultaneously to the m driving electrodes with which the first response electrode forms the m capacitor nodes, thus m coupled signals coupled to the first response electrode are obtained, and output to m correlators. The correlation operation, with the m code sequences corresponding to the m capacitor nodes, is performed on the m coupled signals, so as to calculate a correlation value corresponding to each capacitor node.

It is to be noted that FIG. 13 merely exemplarily shows the m correlators. However, each capacitor node actually each corresponds to a correlator, thus there are m*n correlators. For example, with reference to FIG. 7, m=5, n=5, i.e., the driving and the response terminals of the touch screen include respectively 5 driving electrodes and 5 response electrodes of which both intersect with each other to form 25 capacitor nodes, and there are 25 correlators correspondingly.

At sub-step 3042, (m−1) interference values corresponding to the capacitor node are calculated in accordance with the preset capacitor time constants of the (m−1) capacitor nodes excluding said capacitor node, where the (m−1) interference values are generated by the (m−1) capacitor nodes respectively.

In particular, for each capacitor node, the setting of the preset capacitor time constants of the (m−1) capacitor nodes excluding said capacitor node will be described in detail in the following.

At step 3043, the (m−1) interference values corresponding to said capacitor node are subtracted from the current correlation value corresponding to said capacitor node to obtain a capacitor detection value of said capacitor node.

In particular, the capacitor detection value of said capacitor node can be obtained by eliminating interferences from other (m−1) capacitor nodes.

In the present embodiment, capacitor detection values of the corresponding m capacitor nodes on a response electrode are obtained by the aforementioned steps of calculation. The capacitor detection values of the respective m capacitor nodes on other (n−1) response electrodes can be calculated by the aforementioned steps. The m*n capacitor detection values obtained thereby are the touch detection signals.

Figure 14:
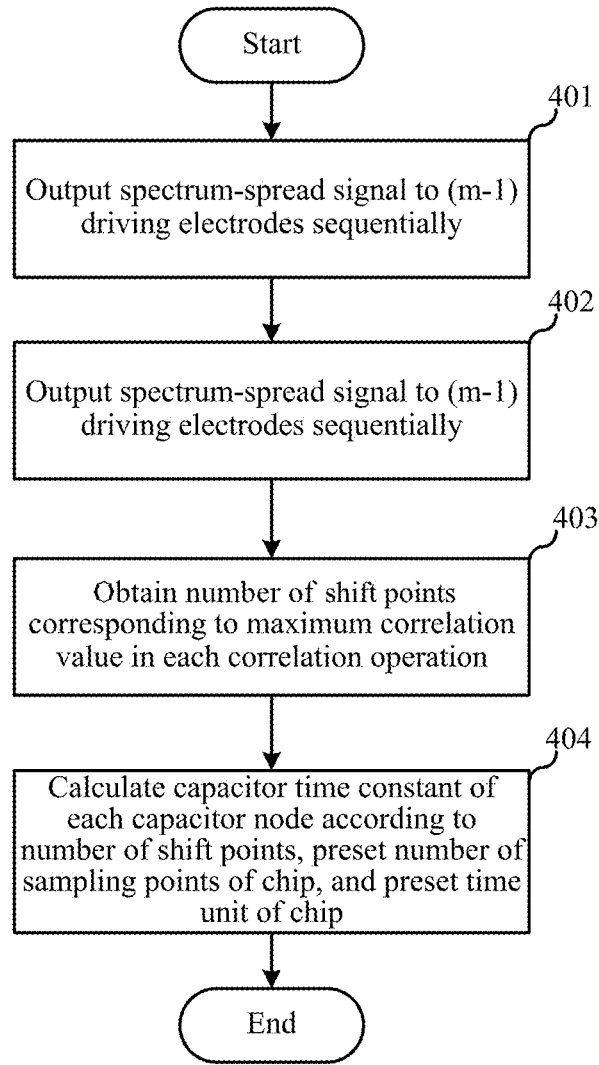
FIG. 14 is a specific flowchart for setting a preset capacitor time constants of (m−1) capacitance nodes excluding the capacitor node according to the third embodiment of the present application.

In the present embodiment, the specific flowchart for setting a preset capacitor time constants of the (m−1) capacitor nodes excluding said capacitor node is shown in FIG. 14.

At step 401, the spectrum-spread signal is output to the (m−1) driving electrodes sequentially.

In particular, the driving signal subjected to a spread spectrum is output to the (m−1) driving electrodes sequentially.

At step 402, a correlation operation is performed sequentially on the (m−1) coupled signals output sequentially from the response electrode.

In particular, the correlation operation, with the (m−1) code sequences corresponding to the (m−1) capacitor nodes, is performed on the (m−1) coupled signals, respectively, and a correlation value corresponding to each capacitor node is calculated.

At step 403, the number of shift points corresponding to the maximum correlation value in each correlation operation is obtained.

In particular, the number of shift points is the number of times of a shifting by the step size of the sliding-correlation de-spread spectrum when the shifting reaches the maximum correlation value.

At step 404, a preset capacitor time constant of each capacitor node is calculated in accordance with the number of shift points, the preset number of the sampled points of the chip and a preset time unit of the chip.

In particular, the preset capacitor time constant of the capacitor node=(the number of shift points/the number of the sampled points of the chip)*the time unit of the chip, where the number of shift points is known, and the number of the sampled points of the chip and the time unit of the chip can be preset, thus the preset capacitor time constant of the capacitor node can be calculated.

In the present embodiment, the preset capacitor time constants of the m−1 capacitor nodes formed by the m−1 driving electrodes and a single response electrode are calculated sequentially in the case of a mode of single driving input. In practice, all of the preset capacitor time constants of the m capacitor nodes are derivable. According to the above steps, the preset capacitor time constants corresponding to m*n capacitor nodes can be derived.

A method of calculating the capacitor detection values is described in detail in the following.

1. A driving signal is coded by $\cos(\omega t)$ and the coded driving signal is modulated by spread spectrum, i.e., the coded driving signal is multiplied by the PN code to obtain a spectrum-spread signal, that is, $\cos(\omega t) \Box Pn(t)$;

2. When the spectrum-spread signal $\cos(\omega t) \Box Pn(t)$ is output to the driving electrode of the touch screen, the spectrum-spread signal $\cos(\omega t) \Box Pn(t)$ received by the driving electrode is coupled to a single response electrode to form a coupled signal:

$$r(t) = C_1 \cos(\omega t - \omega\tau_1) \cdot Pn_1(t-\tau_1) + C_2 \cos(\omega t - \omega\tau_2) \cdot Pn_2(t-\tau_2) + \ldots C_m \cos(\omega t - \omega\tau_m) \cdot Pn_m(t-\tau_m)$$

where an intersection between the driving and the response terminals of the touch screen is a coupling node, C is a capacitance of the coupling node, $\tau$ is a time constant of the capacitor node, and $\tau=RC$, and the time constant may also be considered to be a time delay difference between the PN code and a PN code in the received signal;

3. The coupled signal r(t) is sent to m correlators respectively, so as to calculate correlation values of respective capacitor nodes, in order to derive $C_1 C_2 \ldots C_m$;

4. A PN code reference signal is $I_{ref} = \cos(\omega t) \Box Pn(t)$, and $Q_{ref} = \sin(\omega t) \Box Pn(t)$, the spectrum-despread output signal of branch I in a PN_1 correlator is:

$$r(t) \cdot \cos(\omega t + \theta_1) Pn_1(t - \tau_1) = C_1 Pn_1^2(t - \tau_1) \cos^2(\omega t + \theta_1) + \\ C_2 \cos(\omega t + \theta_1) \cos(\omega t + \theta_2) \cdot Pn_1(t - \tau_1) Pn_2(t - \tau_2) + \\ \ldots + C_m \cos(\omega t + \theta_m) \cos(\omega t + \theta_1) \cdot Pn_1(t - \tau_1) Pn_m(t - \tau_m)$$

and the signal output from the correlator is integrated over a time period T, resulting in $$I(k) = \\ C_1 \cdot \frac{P_{11}(k)T}{2} + C_2 \cdot \frac{P_{12}(k)T}{2} \cos(\theta_1 - \theta_2) + \ldots + C_m \cdot \frac{P_{1m}(k)T}{2} \cos(\theta_1 \theta_m)$$

Similarly, an expression of the integration of branch Q over the time period T can be obtained:

$$Q(k) = C_1 \cdot \frac{P_{11}(k)T}{2} \sin 0 + \\ C_2 \cdot \frac{P_{12}(k)T}{2} \sin(\theta_1 - \theta_2) + \ldots + C_m \cdot \frac{P_{1m}(k)T}{2} \sin(\theta_1 - \theta_m).$$

5. It is known from the above expression that the first terms of the branches I and Q is what we need, while the following m−1 terms are interferences resulting from other driving signals, and thus required to be subtracted therefrom.

6. In the case of multiple driving signals, upon a perfect synchronization of PN codes, the de-spread spectrum matrix for branch I is:

$$\begin{bmatrix} P_{11}(k) & P_{12}(k)\cos(\theta_1 - \theta_2) & P_{13}(k)\cos(\theta_1 - \theta_2) & \ldots & P_{1m}(k)\cos(\theta_1 - \theta_m) \\ P_{21}(k)\cos(\theta_1 - \theta_2) & P_{22}(k) & P_{23}(k)\cos(\theta_2 - \theta_3) & \ldots & P_{2m}(k)\cos(\theta_2 - \theta_m) \\ P_{31}(k)\cos(\theta_1 - \theta_3) & P_{32}(k)\cos(\theta_2 - \theta_3) & P_{33}(k) & \ldots & P_{3m}(k)\cos(\theta_3 - \theta_m) \\ \ldots & \ldots & \ldots & \ldots & \ldots \\ P_{m1}(k)\cos(\theta_1 - \theta_m) & P_{m2}(k)\cos(\theta_2 - \theta_m) & P_{m3}(k)\cos(\theta_3 - \theta_m) & \ldots & P_{mm}(k) \end{bmatrix}$$

and in the case of multiple driving signals, upon perfect synchronization of PN codes, the de-spread spectrum matrix for branch Q is:

$$\begin{bmatrix} 0 & P_{12}(k)\cos(\theta_1-\theta_2) & P_{13}(k)\cos(\theta_1-\theta_2) & \ldots & P_{1m}(k)\cos(\theta_1-\theta_m) \\ P_{21}(k)\cos(\theta_1-\theta_2) & 0 & P_{23}(k)\cos(\theta_2-\theta_3) & \ldots & P_{2m}(k)\cos(\theta_2-\theta_m) \\ P_{31}(k)\cos(\theta_1-\theta_3) & P_{32}(k)\cos(\theta_2-\theta_3) & 0 & \ldots & P_{3m}(k)\cos(\theta_3-\theta_m) \\ \ldots & \ldots & \ldots & \ldots & \ldots \\ P_{m1}(k)\cos(\theta_1-\theta_m) & P_{m2}(k)\cos(\theta_2-\theta_m) & P_{m3}(k)\cos(\theta_3-\theta_m) & \ldots & 0 \end{bmatrix}$$

7. All of the values of the respective elements in the aforementioned de-spread spectrum matrices for branches I and Q are derivable, $\theta=\omega\times a$ time delay of the capacitor node which is known, and $\theta$ may be derived thereby. Thus the value of $\theta$ of each term during the PN code synchronization may be derived, thereby obtaining exact values of the m−1 interference terms. The desired capacitor detection value C may be derived by removing interferences from other driving signals.

Compared with the first embodiment, in the present embodiment, it is provided a method of removing the interference terms to obtain the touch detection signal in the case that the multiple driving signals are input to the driving electrode.

Figure 15:
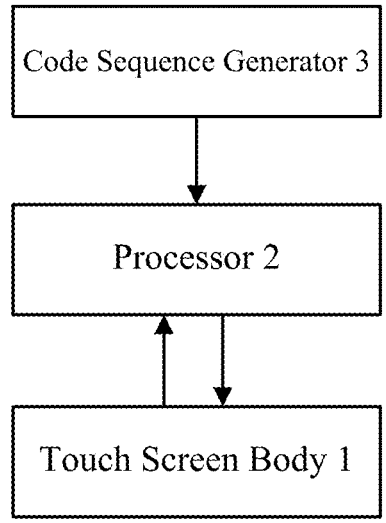
FIG. 15 is a block diagram of a touch detection system according to a fourth embodiment of the present application.

The fourth embodiment of the present application relates to a touch detection system, which is applied to touch-controlled electronic device, such as a mobile phone, and a laptop, etc. With reference to FIG. 15, the touch detection system includes a touch screen body 1, a processor 2, and a code sequence generator 3, the processor being connected to the code sequence generator and the touch screen body.

The code sequence generator 3 is configured to generate a code sequence, and the code sequence generator can be a pseudo random code generator.

The processor 2 is configured to uses the code sequence to perform a spread spectrum process on the driving signal to generate spectrum-spread signal, and to output the spectrum-spread signal to a driving terminal of the touch screen, wherein a mode of the spread spectrum process can be a mode of direct sequence spread spectrum coding.

The processor 2 is further configured to receive a coupled signal from a response terminal of the touch screen, and to perform a de-spread spectrum process on the coupled signal by using the code sequence to obtain a touch detection signal; wherein the coupled signal is formed by coupling the spectrum-spread signal received by the driving terminal to the response terminal.

Figure 16:
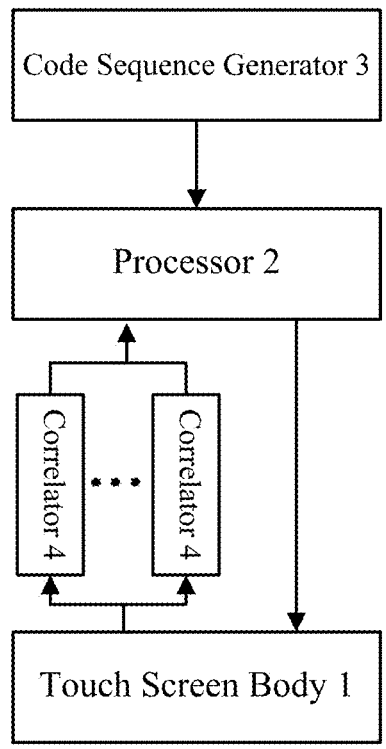
FIG. 16 is a block diagram of a touch detection system according to a fifth embodiment of the present application.

The fifth embodiment of the present application relates to a touch detection system. The present embodiment is an elaboration of the fourth embodiment, and the substantial elaboration lies in that in this embodiment, with reference to FIG. 16, the touch detection system also includes m*n correlators 4.

In the present embodiment, the driving and the response terminals respectively include m driving electrodes and n response electrodes of which both intersect with each other to form m*n capacitor nodes, the m*n correlators 4 being connected to a processor respectively and corresponding to the m*n capacitor nodes respectively.

Each response electrode intersects with the m driving electrodes to form m capacitor nodes, and the response electrode is connected to the m correlators 4 corresponding to m capacitor nodes respectively, so as to output the coupled signal of the response electrode to the m correlators 4 simultaneously, each correlator 4 performing a correlation operation on the received coupled signal, and generating the a current correlation value corresponding to each capacitor node.

The processor 2 calculates (m−1) interference values corresponding to said capacitor node according to the preset capacitor time constants of the (m−1) capacitor nodes excluding each said capacitor node, wherein the (m−1) interference values are generated by the (m−1) capacitor nodes respectively, and subtracts the (m−1) interference values corresponding to said capacitor node from a current correlation value corresponding to each said capacitor node to obtain a capacitor detection value of said capacitor node.

In the present embodiment, the obtained capacitor detection values of the m*n capacitor nodes are the touch detection signals.

In comparison with the fourth embodiment, in the present embodiment, it is provided a specific way of obtaining the touch detection signal.

The sixth embodiment of the present application provides a computer readable storage medium, including a computer program used in combination with a portable electronic device having a touch sensitive display, the computer program may be executed by a processor to complete steps of: performing a spread spectrum process on a driving signal to generate a spectrum-spread signal; outputting the spectrum-spread signal to a driving terminal of a touch screen; receiving, from a response terminal of the touch screen, a coupled signal formed by coupling the spectrum-spread signal received by the driving terminal to the response terminal; performing a de-spread spectrum process on the coupled signal to obtain a touch detection signal.

The seventh embodiment of the present application provides an electronic device, including one or more processors; a memory; and one or more programs which are stored in the memory and configured to be executed by one or more processors, the program(s) including instructions for performing steps of: performing a spread spectrum process on a driving signal to generate a spectrum-spread signal; outputting the spectrum-spread signal to a driving terminal of a touch screen; receiving, from a response terminal of the touch screen, a coupled signal formed by coupling the spectrum-spread signal received by the driving terminal to the response terminal; performing a de-spread spectrum process on the coupled signal to obtain a touch detection signal.

In the sixth embodiment, the code sequence is generated by a code sequence generator outside the processor, while in the present embodiment, the code sequence can be pre-stored within the processor or generated in real time by an internal software.

Those skilled in the art can understand that all or part of the steps in the methods in the above mentioned embodiments can be completed by instructing the related hardware by a program which is stored in a storage medium, and includes several instructions configured to cause a device (e.g., a microcontroller, and a chip, etc.) or a processor to perform all or some steps of the method described in each embodiment of the present application. The storage media as described above include various media such as a USB disk, a mobile hard disk, a Read-Only Memory (ROM), a Random Access Memory (RAM), a magnetic disc or an optical disk and so on that are capable of storing program codes.

Those skilled in the art should appreciate that the aforementioned embodiments are specific embodiments for implementing the present invention. In practice, however, many changes can be made in the forms and details of the specific embodiments without departing from the spirit and scope of the invention.

What is claimed is:

1. A touch detection method, comprising:
performing a spread spectrum process on a driving signal to generate a spectrum-spread signal;
outputting the spectrum-spread signal to a driving terminal of a touch screen;
receiving, from a response terminal of the touch screen, a coupled signal formed by coupling the spectrum-spread signal received by the driving terminal to the response terminal; and
performing a de-spread spectrum process on the coupled signal to obtain a touch detection signal;
wherein a mode of the spread spectrum process is a mode of a direct sequence spread spectrum coding.

2. The touch detection method according to claim 1, wherein a mode of the de-spread spectrum process is a mode of a sliding-correlation de-spread spectrum, and a step size of the sliding-correlation de-spread spectrum is less than or equal to a minimum value among a plurality of preset capacitor time constants corresponding to a plurality of capacitor nodes in the touch screen.

3. The touch detection method according to claim 2, wherein the step size of the sliding-correlation de-spread spectrum and a sampling frequency of a chip of a code sequence in the de-spread spectrum process are the reciprocal with respect to each other, and a mode of setting the sampling frequency of the chip comprises:
calculating a number of the sampled points of the chip according to a preset threshold of an autocorrelation function of the code sequence; and
calculating the sampling frequency of the chip in accordance with the number of sampled points of the chip, and a length and a time width of the code sequence.

4. The touch detection method according to claim 3, wherein calculating the number of the sampled points of the chip according to the preset threshold of the autocorrelation function of the code sequence comprises:
calculating a time delay difference threshold corresponding to the preset threshold in accordance with an expression of the autocorrelation function and the preset threshold; and
calculating the number of the sampled points of the chip in accordance with the time delay difference threshold.

5. The touch detection method according to claim 2, wherein the driving terminal and the response terminal comprise respectively m driving electrodes and n response electrodes of which both intersect with each other to form m*n capacitor nodes; each response electrode intersecting with the m driving electrodes to form m capacitor nodes; and the spectrum-spread signal being output to the m driving electrodes simultaneously;
the performing the de-spread spectrum process on the coupled signal to obtain the touch detection signal specifically comprising:
performing respectively a correlation operation, with the m code sequences corresponding to the m capacitor codes, on the coupled signal output from each response electrode, and generating a current correlation value corresponding to each said capacitor node;
calculating, for each said capacitor node, (m−1) interference values corresponding to said capacitor node in accordance with the preset capacitor time constants of the (m−1) capacitor nodes excluding said capacitor node, wherein the (m−1) interference values are respectively generated by the (m−1) capacitor nodes;
subtracting the (m−1) interference values corresponding to said capacitor node from the current correlation value corresponding to said capacitor node to obtain a capacitor detection value of said capacitor node;
wherein the touch detection signal comprises the capacitor detection values of the m*n capacitor nodes.

6. The touch detection method according to claim 5, wherein the setting of the preset capacitor time constants of the (m−1) capacitor nodes excluding said capacitor node comprises:
outputting the spectrum-spread signal to the (m−1) driving electrodes sequentially;
performing sequentially a correlation operation on the (m−1) coupled signals output sequentially from the response electrode;
obtaining a number of shift points corresponding to a maximum correlation value in each correlation operation; and
calculating a preset capacitor time constant of each said capacitor node in accordance with the number of shift points, a preset number of the sampled points of the chip and a preset time unit of the chip.

7. The touch detection method according to claim 1, wherein the same code sequence is used in the spread spectrum process and the de-spread spectrum process, and the code sequence is pre-stored in a built-in storage module or generated in real time by a built-in code sequence generating module.

8. A touch detection system, comprising: a touch screen body, a processor, and a code sequence generator; the processor being connected to the code sequence generator and the touch screen body;
the code sequence generator being configured for generating a code sequence;
the processor being configured for performing a spread spectrum process on a driving signal by using the code sequence to generate a spectrum-spread signal, and for outputting the spectrum-spread signal to a driving terminal of the touch screen body; and
the processor is further configured for receiving a coupled signal from a response terminal of the touch screen body, and for performing a de-spread spectrum process on the coupled signal by using the code sequence to obtain a touch detection signal; wherein the coupled signal is formed by coupling the spectrum-spread signal received by the driving terminal to the response terminal;
wherein a mode of the spread spectrum process is a mode of a direct sequence spread spectrum coding.

9. The touch detection system according to claim 8, wherein the driving terminal and the response terminal respectively comprise m driving electrodes and n response electrodes of which both intersect with each other to form m*n capacitor nodes; and the touch detection system also comprises m*n correlators being connected respectively to a processor and corresponding respectively to the m*n capacitor nodes;
each response electrode intersecting with the m driving electrodes to form m capacitor nodes, the response electrode being connected respectively to m correlators corresponding to the m capacitor nodes, for outputting the coupled signal of the response electrode to the m correlators simultaneously;

each of the correlator performing a correlation operation on the received coupled signals, and generating a current correlation value of each said capacitor node;

the processor calculating (m−1) interference values corresponding to said capacitor node according to the preset capacitor time constants of the (m−1) capacitor nodes excluding each said capacitor node, wherein the (m−1) interference values are generated by the (m−1) capacitor nodes respectively; and subtracting the (m−1) interference values corresponding to said capacitor node from a current correlation value corresponding to each said capacitor node to obtain a capacitor detection value of such said capacitor node;

wherein the touch detection signal comprises the capacitor detection values of the m*n capacitor nodes.

10. The touch detection system according to claim 8, wherein a mode of the spread spectrum process is a mode of a direct sequence spread spectrum coding, and the code sequence generator is a pseudo random code generator.

11. An electronic device, comprising one or more processors;

a memory; and one or more programs which are stored in the memory and configured to be executed by the one or more processors, the program including instructions for performing steps of:

performing a spread spectrum process on a driving signal to generate a spectrum-spread signal;

outputting the spectrum-spread signal to a driving terminal of a touch screen;

receiving, from a response terminal of the touch screen, a coupled signal formed by coupling the spectrum-spread signal received by the driving terminal to the response terminal; and performing a de-spread spectrum process on the coupled signal to obtain a touch detection signal;

wherein a mode of the spread spectrum process is a mode of a direct sequence spread spectrum coding.

\* \* \* \* \*